United States Patent
Nakanishi et al.

(10) Patent No.: US 9,592,823 B2
(45) Date of Patent: Mar. 14, 2017

(54) CONTROL DEVICE FOR HYBRID ELECTRIC VEHICLE CLUTCH ENGAGEMENT

(71) Applicants: Naoki Nakanishi, Susono (JP); Masato Yoshikawa, Susono (JP); Shintaro Matsutani, Toyota (JP)

(72) Inventors: Naoki Nakanishi, Susono (JP); Masato Yoshikawa, Susono (JP); Shintaro Matsutani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/652,251

(22) PCT Filed: Dec. 17, 2012

(86) PCT No.: PCT/JP2012/082686
§ 371 (c)(1),
(2) Date: Jun. 15, 2015

(87) PCT Pub. No.: WO2014/097376
PCT Pub. Date: Jun. 26, 2014

(65) Prior Publication Data
US 2015/0367842 A1  Dec. 24, 2015

(51) Int. Cl.
*B60W 20/40* (2016.01)
*B60W 20/00* (2016.01)
(Continued)

(52) U.S. Cl.
CPC ............... *B60W 20/40* (2013.01); *B60K 6/48* (2013.01); *B60K 6/547* (2013.01); *B60W 10/02* (2013.01);
(Continued)

(58) Field of Classification Search
USPC ................ 903/930, 946, 917; 701/22, 68; 180/65.265, 65.25, 65.275, 293
See application file for complete search history.

(56) References Cited

U.S. PATENT DOCUMENTS

2003/0062206 A1\* 4/2003 Fujikawa ............... B60K 6/383
180/65.25
2006/0089232 A1 4/2006 Kobayashi et al.
(Continued)

FOREIGN PATENT DOCUMENTS

JP 2006-131037 A 5/2006
JP 2007-069790 A 3/2007
(Continued)

*Primary Examiner* — Thomas Tarcza
*Assistant Examiner* — Richard Goldman
(74) *Attorney, Agent, or Firm* — Oliff PLC

(57) ABSTRACT

Control device of a vehicle including an engine, electric motor, and clutch in a power transmission path between the engine and motor, which increases the engine's rotation speed in a release or slip state of the clutch after self-sustaining operation of the engine is enabled after starting, providing either a first engine start control where control for engagement of the clutch starts before rotation speed of the engine reaches that of the motor when the engine's rotation speed is increasing, or second control where control for engagement of the clutch starts after the engine's rotation speed is synchronized with that of the motor, or during the process of synchronization, by reducing the engine's rotation speed after it exceeds that of the motor during an increase in the engine's rotation speed, the device using the first or second engine start control in accordance with a vehicle state when starting the engine.

7 Claims, 5 Drawing Sheets

(51) Int. Cl.
  *B60K 6/48* (2007.10)
  *B60K 6/547* (2007.10)
  *B60W 10/02* (2006.01)
  *B60W 10/06* (2006.01)
  *B60W 30/192* (2012.01)

(52) U.S. Cl.
  CPC ............ *B60W 10/06* (2013.01); *B60W 20/00* (2013.01); *B60W 30/192* (2013.01); *B60W 2510/0208* (2013.01); *B60W 2510/0241* (2013.01); *B60W 2510/081* (2013.01); *B60W 2710/0644* (2013.01); *Y02T 10/6221* (2013.01)

(56) References Cited

U.S. PATENT DOCUMENTS

| | | |
|---|---|---|
| 2006/0089235 A1 | 4/2006 | Kobayashi |
| 2008/0009388 A1* | 1/2008 | Tabata ................ B60K 6/445 477/2 |
| 2008/0083579 A1* | 4/2008 | Okuda .................. B60K 6/52 180/293 |
| 2010/0324762 A1* | 12/2010 | Imaseki ................ B60K 6/36 701/22 |
| 2011/0092328 A1* | 4/2011 | Tiwari .................. B60K 6/365 475/5 |
| 2011/0111905 A1* | 5/2011 | Tiwari .................. B60K 6/365 475/2 |
| 2013/0029805 A1 | 1/2013 | Matsuo et al. |
| 2015/0239468 A1* | 8/2015 | Nakanishi ............ B60K 6/48 477/167 |
| 2015/0367842 A1* | 12/2015 | Nakanishi ............ B60K 6/48 701/22 |
| 2016/0082824 A1* | 3/2016 | Inoue .................... B60K 6/48 701/22 |
| 2016/0176396 A1* | 6/2016 | Hata .................... B60W 10/02 701/22 |
| 2016/0221580 A1* | 8/2016 | Yamanaka ...... B60W 30/18072 477/167 |

FOREIGN PATENT DOCUMENTS

| | | |
|---|---|---|
| JP | 2010-149714 A | 7/2010 |
| JP | 2011-016390 A | 1/2011 |
| JP | 2013-028208 A | 2/2013 |

* cited by examiner

CONTROL DEVICE FOR HYBRID ELECTRIC VEHICLE CLUTCH ENGAGEMENT

TECHNICAL FIELD

The present invention relates to a control device of a vehicle including a clutch disposed on a power transmission path between an engine and an electric motor.

BACKGROUND ART

A vehicle is well-known that includes an engine, an electric motor, and a clutch disposed in a power transmission path between the engine and the electric motor and capable of separating the engine from drive wheels. In such a vehicle, the engine is stopped while the clutch is released. Various methods are proposed for starting the engine from such a state. For example, in a technique proposed in Patent Document 1, when a start of the engine is requested in the vehicle, the clutch is controlled for engagement to rotationally drive (crank) the engine by an output torque (synonymous with power and force if not particularly distinguished) of an electric motor so as to start the engine. In a technique proposed in Patent Document 2, when a start of the engine is requested in the vehicle, an engine rotation speed is increased in a release state of the clutch after the engine rotation has reached a speed level enabling a self-sustaining operation of the engine, and the engagement of the clutch is started after the engine rotation speed becomes higher than an electric motor rotation speed.

PRIOR ART DOCUMENT

Patent Documents

Patent Document 1: Japanese Laid-Open Patent Publication No. 2006-131037
Patent Document 2: Japanese Laid-Open Patent Publication No. 2011-16390

SUMMARY OF THE INVENTION

Problem to be Solved by the Invention

Although a prompt engine start can be expected from the technique as described in Patent Document 1, a shock may occur if a gap occurs between a torque capacity at the time of control for engagement of the clutch (hereinafter, clutch torque) and an electric motor torque increased for cranking the engine (hereinafter, an electric motor compensation torque). On the other hand, since the electric motor compensation torque is not output at the time of control for engagement of the clutch in the technique as described in Patent Document 2, the engagement shock of the clutch can be suppressed. As compared to the technique as described in Patent Document 1, however, the technique as described in Patent Document 2 delays the complete engagement of the clutch and requires time before shifting to running performed by using the power of the engine and, therefore, for example, vehicle responsiveness to an acceleration request may deteriorate. The problem as described above is unknown and no proposal has hitherto been made on satisfying both suppression of a start shock and the prompt engine start in the case of using a technique of increasing the engine rotation speed in a release or slip state of the clutch after the engine rotation has reached the speed level enabling the self-sustaining operation of the engine at the engine start. The engine start in this case means not only that the engine rotation speed has reached the speed level enabling the self-sustaining operation but also a series of control operations related to the engine start until the clutch is completely engaged.

The present invention was conceived in view of the situations and it is therefore an object of the present invention to provide a control device of a vehicle capable of satisfying both the suppression of a start shock and the improvement in responsiveness of an engine start when the engine is started in such a manner that an engine rotation speed is increased in a release or slip state of a clutch after the engine is operated (after self-sustaining operation is enabled).

Means for Solving the Problem

To achieve the object, the first aspect of the invention provides a control device of a vehicle (a) including an engine, an electric motor, and a clutch disposed in a power transmission path between the engine and the electric motor, (b) the control device of a vehicle increasing a rotation speed of the engine in a release or slip state of the clutch after a self-sustaining operation of the engine is enabled when the engine is started, the control device of a vehicle providing either (c) a first engine start control in which a control for complete engagement of the clutch is started before the rotation speed of the engine reaches a rotation speed of the electric motor during an increase in the rotation speed of the engine, or (d) a second engine start control in which the control for complete engagement of the clutch is started after the rotation speed of the engine is synchronized with the rotation speed of the electric motor, or while the rotation speed of the engine is on the way to the synchronization, by reducing the rotation speed of the engine after the rotation speed of the engine exceeds the rotation speed of the electric motor during an increase in the rotation speed of the engine, and (e) the control device of a vehicle selectively using the first engine start control and the second engine start control in accordance with a vehicle state when a start of the engine is required.

Effects of the Invention

This enables selective use of the first engine start control in which the engine is relatively promptly started although the start shock easily occurs and the second engine start control in which the start shock is easily suppressed although the engine is relatively slowly started, in accordance with a situation when the start of the engine is requested. Therefore, when the engine is started in such a manner that the rotation speed of the engine is increased in the release or slip state of the clutch after the engine is operated, both the suppression of the start shock and the improvement in responsiveness of the engine start can be satisfied.

The second aspect of the invention provides the control device of a vehicle recited in the first aspect of the invention, wherein when a start of the engine due to an artificial operation is requested, the first engine start control is provided, and wherein when a start of the engine not due to the artificial operation is requested, the second engine start control is provided. Consequently, both the suppression of the start shock and the improvement in responsiveness of the engine start can properly be satisfied by switching the engine start control between an engine start request due to the artificial operation (hereinafter, referred to as a user request) and an engine start request not due to the artificial operation (that is, an engine start request commanded by a control device irrespective of the artificial operation (hereinafter, referred to as a system request)). In particular, a prompt start can be achieved at the start due to a user request at which the improvement in responsiveness is more desirable than the suppression of the start shock since prompt acceleration of the vehicle is demanded. In addition, the start can be achieved with the shock suppressed at the start due to a system request at which the suppression of the start shock is more desirable for a user than the improvement in responsiveness since the engine is started independently of the user operation.

The third aspect of the invention provides the control device of a vehicle recited in the first aspect of the invention, wherein a transmission making up a portion of a power transmission path between the electric motor and the drive wheels is further included, and wherein the first engine start control is provided when a gear ratio of the transmission is a high gear ratio as compared to the second engine start control. Consequently, although the sensitivity to a shock tends to become lower when the gear ratio is a higher gear ratio, since the provision of the first engine start control is more facilitated when the gear ratio is a higher gear ratio, the engine can promptly be started at a high gear ratio and the shock can be reduced at a low gear ratio. Therefore, the fuel consumption is improved by suppressing unnecessary fuel injection at a high gear ratio, and the drivability can be improved at a low gear.

The fourth aspect of the invention provides the control device of a vehicle recited in the second aspect of the invention, wherein when the start of the engine due to the artificial operation and the start of the engine not due to the artificial operation are overlappingly requested, the first engine start control is preferentially provided. Consequently, the responsiveness of the start due to a user request can be improved and the drivability is improved. For example, if a user request is made during the start due to a system request and the second engine start control is continued without change, the responsiveness may deteriorate. With respect to this, a reduction in the responsiveness can be suppressed by making a switch to the first engine start control that is the engine start control at the start due to a user request.

The fifth aspect of the invention provides the control device of a vehicle recited in any one of the first to the fourth aspects of the invention, wherein a fluid power transmission device is also included that has a lockup clutch disposed in the power transmission path between the electric motor and the drive wheels, wherein when the lockup clutch is engaged at starting of the engine, the operation of the engine is started after a shift of the lockup clutch to a slip state is started, and wherein the second engine start control delays timing of start of the operation of the engine as compared to the first engine start control. Consequently, the shock reduction effect from the slip state of the lockup clutch is more easily acquired and the shock can further be reduced at the start through the second engine start control.

The sixth aspect of the invention provides the control device of a vehicle recited in the fifth aspect of the invention, wherein the second engine start control has a longer period from a start of the shift of the lockup clutch to the slip state until the lockup clutch actually slips as compared to the first engine start control. Consequently, although if the lockup clutch is rapidly shifted to the slip state, a shock easily occurs, the shock at the start through the second engine start control can further be reduced by slowly shifting the lockup clutch to the slip state so that the shock hardly occurs.

MODE FOR CARRYING OUT THE INVENTION

In the present invention, preferably, the transmission may be any one of various automatic transmissions, or a manual transmission such as a known synchronous meshing type parallel two-shaft automatic transmission that includes a plurality of pairs of continuously meshing change gears between two shafts. The automatic transmission can be a single automatic transmission, an automatic transmission having a fluid power transmission device, or an automatic transmission having an auxiliary transmission. For example, the automatic transmission can be a known planetary gear type automatic transmission including a plurality of sets of planetary gear devices; a known synchronous meshing type parallel two-shaft automatic transmission that is a synchronous meshing type parallel two-shaft transmission and that has gear stages automatically switched by a hydraulic actuator; a so-called DCT (Dual Clutch Transmission) that is a synchronous meshing type parallel two-shaft automatic transmission and that is of a type having two systems of input shafts; a so-called belt type continuously variable transmission and a so-called toroidal type continuously variable transmission having gear ratios varied continuously in a stepless manner, etc.

Preferably, the engine is an internal combustion engine such as a gasoline engine and a diesel engine generating power from combustion of fuel, for example. The clutch disposed on the power transmission path between the engine and the electric motor is a wet or dry engagement device.

An example of the present invention will now be described in detail with reference to the drawings.

Example

Figure 1:
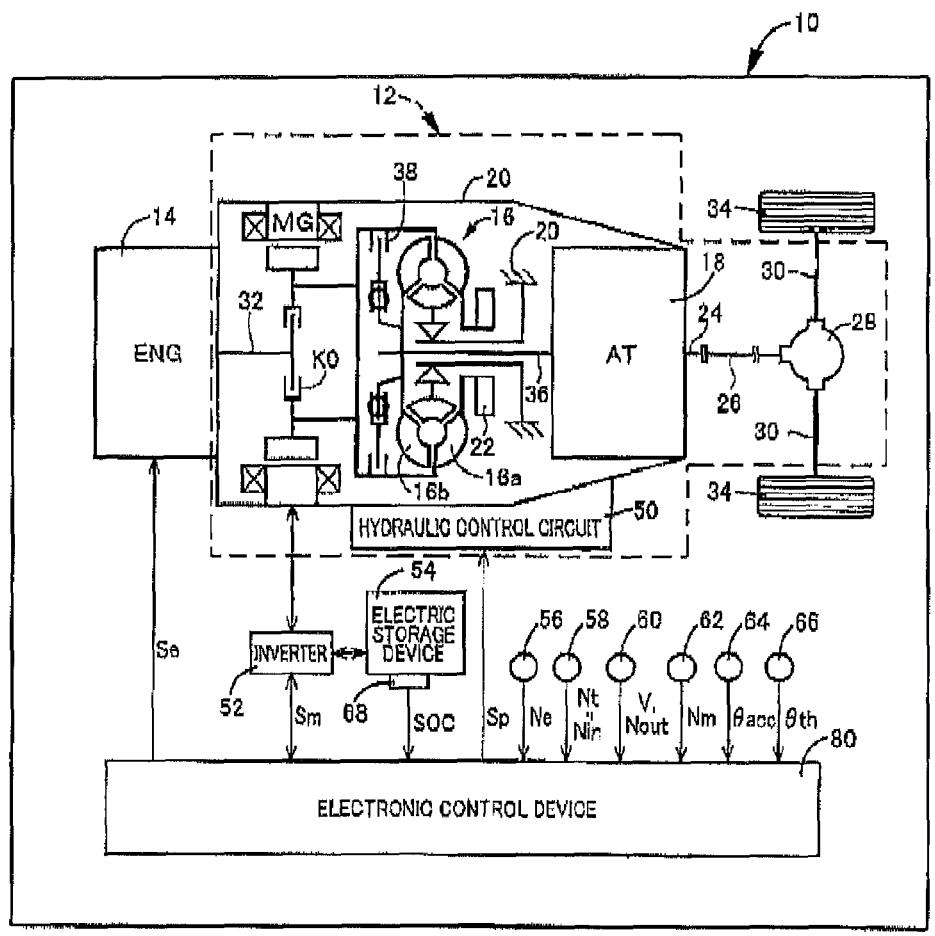
FIG. 1 is a diagram for explaining a general configuration of a power transmission device included in a vehicle to which the present invention is applied, and is a diagram for explaining a main portion of a control system in the vehicle.

FIG. 1 is a diagram for explaining a general configuration of a power transmission device 12 included in a vehicle 10 to which the present invention is applied, and is a diagram for explaining a main portion of a control system for various types of control in the vehicle 10. In FIG. 1, the vehicle 10 is a hybrid vehicle including an engine 14 and an electric motor MG acting as drive force sources for running. The power transmission device 12 includes in a transmission case 20 acting as a non-rotating member, an engine connecting/disconnecting clutch K0 (hereinafter referred to as a connecting/disconnecting clutch K0), a torque converter 16, and an automatic transmission 18 in order from the engine 14 side. The power transmission device 12 also includes a propeller shaft 26 coupled to a transmission output shaft 24 that is an output rotating member of the automatic transmission 18, a differential gear device 28 coupled to the propeller shaft 26, a pair of axles 30 coupled to the differential gear device 28, etc. The power transmission device 12 configured as described above is preferably used in the vehicle 10 of the FR (front-engine rear-drive) type, for example. In the power transmission device 12, when the connecting/disconnecting clutch K0 is engaged, power (synonymous with a torque and a force if not particularly distinguished) of the engine 14 is transmitted from an engine coupling shaft 32 coupling the engine 14 and the connecting/disconnecting clutch K0, sequentially through the connecting/disconnecting clutch K0, the torque converter 16, the automatic transmission 18, the propeller shaft 26, the differential gear device 28, the pair of the axles 30, etc., to a pair of drive wheels 34. As described above, the power transmission device 12 makes up a power transmission path from the engine 14 to the drive wheels 34.

The torque converter 16 is disposed on the power transmission path between the engine 14 (and the electric motor MG) and the drive wheels 34. The torque converter 16 is a fluid power transmission device transmitting power, which is input to a pump impeller 16a that is an input-side rotating member, via fluid to output the power from a turbine impeller 16b that is an output-side rotating member. The pump impeller 16a is coupled via the connecting/disconnecting clutch K0 to the engine coupling shaft 32 and is directly coupled to the electric motor MG. The turbine impeller 16b is directly coupled to a transmission input shaft 36 that is an input rotating member of the automatic transmission 18. The torque converter 16 includes a known lockup clutch 38 directly coupling the pump impeller 16a and the turbine impeller 16b. Therefore, the lockup clutch 38 is capable of achieving a mechanically directly-coupled state of the power transmission path from the engine 14 and the electric motor MG to the drive wheels 34. An oil pump 22 is coupled to the pump impeller 16a. The oil pump 22 is a mechanical oil pump rotationally driven by the engine 14 (and/or the electric motor MG) to generate a hydraulic oil pressure for providing shift control of the automatic transmission 18 and engagement/release control of the connecting/disconnecting clutch K0. The lockup clutch 38 is subjected to engagement/release control by a hydraulic control circuit 50 disposed in the vehicle 10 by using the oil pressure generated by the oil pump 22 as an original pressure.

The electric motor MG is a so-called motor generator having a function of a motor generating mechanical power from electric energy and a function of an electric generator generating electric energy from mechanical energy. The electric motor MG acts as a drive force source for running generating power for running in instead of the engine 14 that is a power source or along with the engine 14. The electric motor MG also performs operations such as generating electric energy through regeneration from the power generated by the engine 14 or a driven force input in the direction from the drive wheels 34 to accumulate the electric energy via an inverter 52 into an electric storage device 54. The electric motor MG is coupled to a power transmission path between the connecting/disconnecting clutch K0 and the torque converter 16 (i.e., operatively coupled to the pump impeller 16a) and power is mutually transmitted between the electric motor MG and the pump impeller 16a. Therefore, the electric motor MG is coupled to the transmission input shaft 36 of the automatic transmission 18 in a power transmittable manner without going through the connecting/disconnecting clutch K0.

The connecting/disconnecting clutch K0 is a wet multi-plate type hydraulic friction engagement device in which a plurality of friction plates overlapped with each other is pressed by a hydraulic actuator, for example, and is subjected to the engagement/release control by the hydraulic control circuit 50 by using the oil pressure generated by the oil pump 22 as an original pressure. In the engagement/release control, a torque capacity of the connecting/disconnecting clutch K0 (referred to as a K0 torque) is varied through pressure adjustment of a linear solenoid valve etc., in the hydraulic control circuit 50, for example. In an engaged state of the connecting/disconnecting clutch K0, the pump impeller 16a and the engine 14 are integrally rotated via the engine coupling shaft 32. On the other hand, in a release state of the connecting/disconnecting clutch K0, the power transmission between the engine 14 and the pump impeller 16a is disconnected. Therefore, the engine 14 and the drive wheels 34 are separated by releasing the connecting/disconnecting clutch K0. Since the electric motor MG is coupled to the pump impeller 16a, the connecting/disconnecting clutch K0 also acts as a clutch disposed on the power transmission path between the engine 14 and the electric motor MG to connect/disconnect the power transmission path.

The automatic transmission 18 is a transmission making up a portion of the power transmission path from the engine 14 and the electric motor MG to the drive wheels 34 to transmit the power from the drive force source for running (the engine 14 and the electric motor MG) toward the drive wheels 34. The automatic transmission 18 is, for example, a known planetary gear type multistage transmission having a plurality of shift stages (gear stages) with different gear ratios γ=(transmission input rotation speed Nin/transmission output rotation speed Nout) selectively established, or a known continuously variable transmission having a gear ratio γ continuously varied without a step. In the automatic transmission 18, for example, hydraulic actuators are controlled by the hydraulic control circuit 50 to establish a predetermined gear stage (gear ratio) depending on a driver's accelerator operation, a vehicle speed V, etc.

The vehicle 10 includes an electronic control device 80 including a control device of the vehicle 10 related to the engagement/release control of the connecting/disconnecting clutch K0 and the lockup clutch 38, for example. The electronic control device 80 includes a so-called microcomputer including a CPU (central processing unit), a RAM (random access memory), a ROM (read only memory), and an I/O (input/output) interface, for example, and the CPU executes signal processes in accordance with a program stored in advance in the ROM, while utilizing a temporary storage function of the RAM, to provide various types of control of the vehicle 10. For example, the electronic control device 80 provides output control of the engine 14, drive control of the electric motor MG including regenerative control of the electric motor MG, the shift control of the automatic transmission 18, torque capacity control of the connecting/disconnecting clutch K0, torque capacity control of the lockup clutch 38, etc., and is configured separately as needed for the engine control, the electric motor control, the hydraulic control, etc. The electronic control device 80 is supplied with each of various signals (e.g., an engine rotation speed Ne that is a rotation speed of the engine 14, a turbine rotation speed Nt, i.e., a transmission input rotation speed Nin that is a rotation speed of the transmission input shaft 36, a transmission output rotation speed Nout that is a rotation speed of the transmission output shaft 24 corresponding to the vehicle speed V, an electric motor rotation speed Nmg that is a rotation speed of the electric motor MG, an accelerator opening degree θ acc corresponding to a drive demand amount to the vehicle 10 from a driver, a throttle valve opening degree θth of an electronic throttle valve, and a state of charge (charge capacity) SOC of the electric storage device 54) based on detection values from various sensors (e.g., an engine rotation speed sensor 56, a turbine rotation speed sensor 58, an output shaft rotation speed sensor 60, an electric motor rotation speed sensor 62, an accelerator opening degree sensor 64, a throttle sensor 66, and a battery sensor 68). The electronic control device 80 outputs, for example, an engine output control command signal Se for the output control of the engine 14, an electric motor control command signal Sm for controlling operation of the electric motor MG, and oil pressure command signals Sp for actuating an electromagnetic valve (solenoid valve) etc. included in the hydraulic control circuit 50 for controlling the hydraulic actuators of the connecting/disconnecting clutch K0, the lockup clutch 38, and the automatic transmission 18, to engine control devices such as a throttle actuator and a fuel injection device, the inverter 52, and the hydraulic control circuit 50, respectively.

Figure 2:
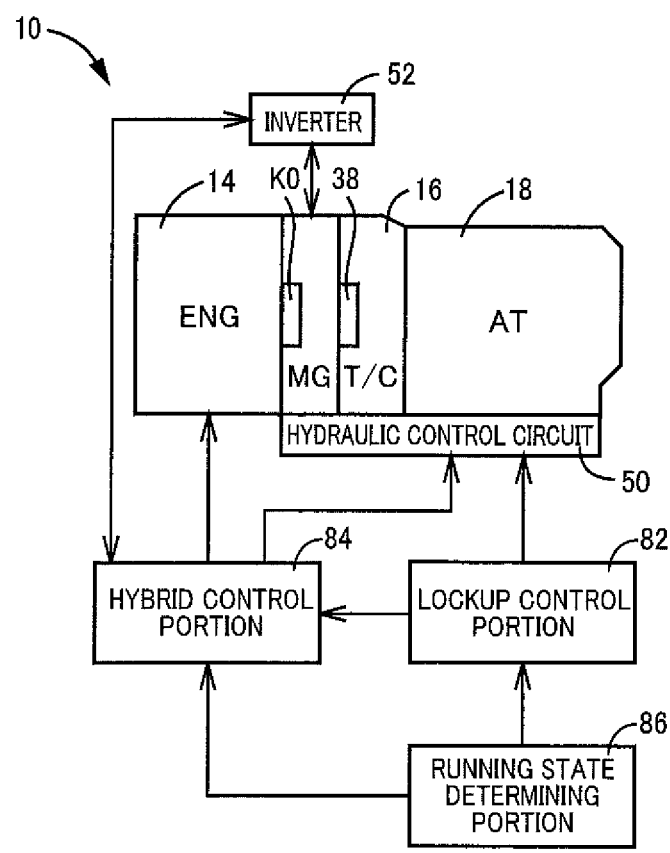
FIG. 2 is a functional block diagram for explaining a main portion of a control function of an electronic control device.
Figure 3:
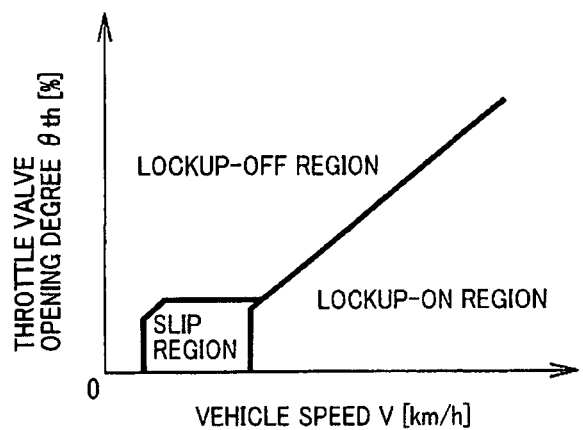
FIG. 3 is a diagram for showing an example of a lockup region diagram used in a control of a lockup clutch.

FIG. 2 is a functional block diagram for explaining a main portion of the control function of the electronic control device 80. In FIG. 2, a lockup control means, i.e., a lockup control portion 82 determines an actuation state (release, slip engagement, or complete engagement for engagement without a slip) to which the lockup clutch 38 should be controlled, based on a vehicle state indicated by the actual vehicle speed V and the throttle valve opening degree θth from a predefined relationship (a map, a lockup region diagram) having a lockup-off region, a slip region, and a lockup-on region as depicted in FIG. 3, for example, and outputs to the hydraulic control circuit 50 a command value (LU command pressure) of an engagement oil pressure (LU pressure) of the lockup clutch 38 for switching to the determined actuation state. This LU command pressure is one of the oil pressure command signals Sp.

A hybrid control means, i.e., a hybrid control portion 84, has a function as an engine drive control portion controlling drive of the engine 14 and a function as an electric motor operation control portion controlling the operation of the electric motor MG as a drive force source or an electric generator through the inverter 52, and provides control of the hybrid drive by the engine 14 and the electric motor MG through these control functions. For example, the hybrid control portion 84 calculates a demand drive torque Touttgt as the drive demand amount (i.e. a driver demand amount) to the vehicle 10 from a driver based on the accelerator opening degree θ acc and the vehicle speed V and outputs command signals (the engine output control command signal Se and the electric motor control command signal Sm) to control the drive force source for running so as to achieve output torque of the drive force source for running (the engine 14 and the electric motor MG) such that the demand drive torque Touttgt is acquired in consideration of a transmission loss, an accessory load, a gear ratio γ of the automatic transmission 18, the charge capacity SOC of the electric storage device 54, etc. The drive demand amount can be implemented by using not only the demand drive torque Touttgt [Nm] at the drive wheels 34 but also a demand drive force [N] at the drive wheels 34, a demand drive power [W] at the drive wheels 34, a demand transmission output torque at the transmission output shaft 24, a demand transmission input torque at the transmission input shaft 36, a target torque of the drive force source for running (the engine 14 and the electric motor MG), etc. The drive demand amount can be implemented by simply using the accelerator opening degree θ acc [%], the throttle valve opening degree θth [%], an intake air amount [g/sec] of the engine 14, etc.

Figure 4:
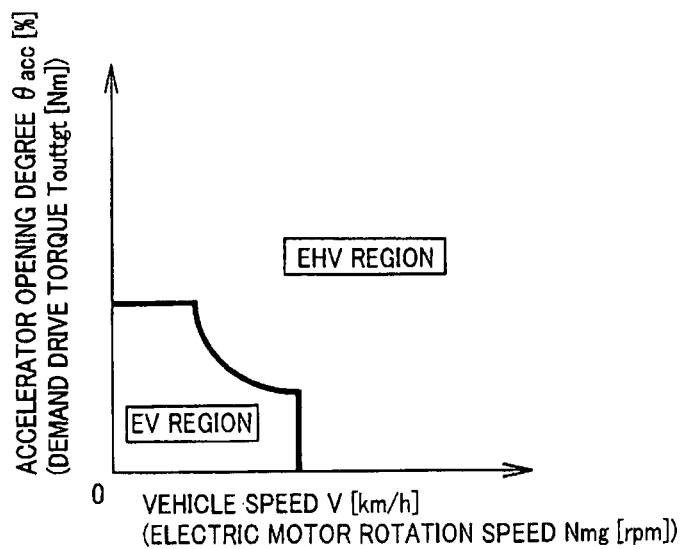
FIG. 4 is a diagram for showing an example of an EV/EHV region map used in switching between EV running and engine running.

Specifically, the hybrid control portion 84 switches a running mode based on a vehicle state indicated by the actual vehicle speed V and the drive demand amount (such as the accelerator opening degree θacc and the demand drive torque Touttgt) from a predefined relationship (an EV/EHV region map) having a motor running region (EV region) and an engine running region (EHV region) as depicted in FIG. 4, for example. If the vehicle state is in the EV region, the hybrid control portion 84 sets the running mode to a motor running mode (hereinafter, EV mode) and performs the motor running (EV running) using only the electric motor MG as the drive force source for running. On the other hand, if the vehicle state is in the EHV region, the hybrid control portion 84 sets the running mode to an engine running mode, i.e., a hybrid running mode (hereinafter, EHV mode), operates the engine, i.e., the hybrid running (EHV running), using at least the engine 14 as the drive force source for running.

If the EV running cannot be performed because discharge is limited based on, for example, the charging capacity SOC and/or dischargeable electric power (power), i.e., an output limitation Wout, corresponding to an electric storage device temperature of the electric storage device 54, if the charging of the electric storage device 54 is requested, or if the engine 14 and equipment related to the engine 14 must be warmed up, the hybrid control portion 84 performs the EHV running performed by operating the engine 14 even if the vehicle state is in the EV region.

If the EV running is performed, the hybrid control portion 84 releases the connecting/disconnecting clutch K0 to disconnect the power transmission path between the engine 14 and the torque converter 16 and causes the electric motor MG to output the MG torque (motor torque, electric motor torque) Tmg required for the EV running. On the other hand, if the EHV running is performed, the hybrid control portion 84 engages the connecting/disconnecting clutch K0 to connect the power transmission path between the engine 14 and the torque converter 16 and causes the engine 14 to output the engine torque Te required for the EHV running while causing the electric motor MG to output the MG torque Tmg as an assist torque as needed.

If a start of the engine 14 is requested during the EV running, the hybrid control portion 84 switches the running mode from the EV mode to the EHV mode and starts the engine 14 to perform the EHV running. Methods of starting the engine 14 include a start method A in which the engine 14 is started by initiating engine ignition and fuel supply while the released connecting/disconnecting clutch K0 is controlled for engagement (from another viewpoint, while the engine 14 is rotationally driven by the electric motor MG), for example. In this start method A, a command value (K0 command pressure) of an engagement oil pressure (K0 oil pressure) of the connecting/disconnecting clutch K0 is output so as to acquire a K0 torque for transmitting an engine start torque that is a torque required for the engine start toward the engine 14. Since the engine start torque corresponds to the MG torque Tmg going through the connecting/disconnecting clutch K0 toward the engine 14, the MG torque Tmg going toward the drive wheels 34 is accordingly reduced. Therefore, to suppress a drop in the drive torque Tout in the start method A, the MG torque is increased by an amount corresponding to the K0 torque for transmitting the engine start torque to the engine 14 in addition to the MG torque Tmg required for satisfying the demand drive torque Touttgt (hereinafter, this increased amount is referred to as a K0 compensation torque (MG compensation torque).

The methods of starting the engine 14 include a start method B due to ignition start in which the engine 14 is started by injecting and exploding (igniting) fuel in a predetermined cylinder (e.g., cylinder in an expansion stroke) out of a plurality of cylinders of the engine 14 during stop of rotation or not in operation, for example. In this start method B, after completion of the start of the engine 14 by the ignition start (i.e., after the engine 14 is operated (after self-sustaining operation is enabled)), the engine rotation speed Ne is increased by the self-sustaining operation of the engine 14 in a release or slip state of the connecting/disconnecting clutch K0. Subsequently, after the engine rotation speed Ne is synchronized with the electric motor rotation speed Nmg or while the engine rotation speed Ne is on the way to the synchronization, the control for complete engagement of the connecting/disconnecting clutch K0 is started. Since a friction torque of the engine 14 (a compression torque corresponding to pumping loss+a mechanical friction torque corresponding to sliding friction) at the engine start varies depending on a crank angle of the engine 14 in the start method B, the K0 torque may temporarily be increased to output the MG compensation torque so as to assist the ignition start such that the self-sustaining operation is certainly be enabled in the engine 14 by the ignition start.

The actual K0 torque may not correctly be estimated from the K0 command pressure due to variations of components and variations of control (e.g., change in friction coefficient of the connecting/disconnecting clutch K0 and variations of hydraulic responsiveness). As a result, a gap may occur in the generation timing or absolute value between the MG compensation torque and the actual K0 torque and drive torque Tout may vary, resulting in a shock at the engine start (start shock). It is considered that such a phenomenon notably appears in the start method A in which the MG compensation torque is necessary or made larger, as compared to the start method B. Additionally, the start method B can be in such a form that the connecting/disconnecting clutch K0 is completely engaged after the engine rotation speed Ne is synchronized with the electric motor rotation speed Nmg by the self-sustaining operation of the engine 14 while the connecting/disconnecting clutch K0 is released, for example, and can suppress the start shock associated with the engagement shock of the connecting/disconnecting clutch K0 as compared to the start method A. Therefore, in this example, when the engine 14 is started during stop of the engine 14 with the connecting/disconnecting clutch K0 released, a form of the start method B is used in such a manner that the engine rotation speed Ne is increased in the release or slip state of the connecting/disconnecting clutch K0 after the engine 14 is operated (i.e., when the self-sustaining operation of the engine 14 is enabled).

Although the start shock can be suppressed as described above, the start method B delays the complete engagement of the connecting/disconnecting clutch K0 and requires time before shifting to the EHV running and, therefore, vehicle responsiveness to an acceleration request may deteriorate. If the form of the start method B is used, it is desired to satisfy both the suppression of the start shock and the improvement in responsiveness of the engine start.

Therefore, when the engine 14 is started in the start method B, the electronic control device 80 of this example provides either a first engine start control in which the control for the complete engagement of the connecting/disconnecting clutch K0 is started before the engine rotation speed Ne reaches the electric motor rotation speed Nmg during an increase in the engine rotation speed Ne, or a second engine start control in which the control for the complete engagement of the connecting/disconnecting clutch K0 is started after the engine rotation speed Ne is synchronized with the electric motor rotation speed Nmg, or while the engine rotation speed Ne is on the way to the synchronization, by reducing the engine rotation speed Ne after the engine rotation speed Ne exceeds the electric motor rotation speed Nmg during an increase in the engine rotation speed Ne. Since the engine rotation speed Ne is actively synchronized with the electric motor rotation speed Nmg by the connecting/disconnecting clutch K0 in the first engine start control, the engine 14 is relatively promptly started although the start shock easily occurs. Since the engine rotation speed Ne is synchronized with the electric motor rotation speed Nmg by providing the rotation speed control of the engine 14 in the second engine start control, the start shock is easily suppressed while the start of the engine 14 is relatively delayed.

The start of the engine 14 may be requested in a situation due to a user request (driver request) in which the start of the engine 14 is requested since a transition of the vehicle state occurs from the EV region to the EHV region because the demand drive torque Touttgt is increased or the vehicle speed V is made higher by an artificial operation (user operation) such as an accelerator depression operation, for example. Additionally, the start of the engine 14 may be requested in a situation due to a system request in which the start of the engine 14 is requested by the electronic control device 80 not due to the artificial operation if the EV running cannot be performed based on the charging capacity SOC and/or the output limitation Wout of the electric storage device 54, if the charging of the electric storage device 54 is requested, or if the engine 14 etc. must be warmed up, for example. It is considered that the improvement in responsiveness is more desirable than the suppression of the start shock at the start due to a user request since prompt acceleration of the vehicle 10 is demanded, for example. On the other hand, it is considered that the suppression of the start shock is more desirable for a user than the improvement in responsiveness at the start due to a system request since the engine 14 is started independently of the user operation, for example. Therefore, the electronic control device 80 provides the first engine start control at the start due to a user request and provides the second engine start control at the start due to a system request.

The vehicle 10 of this example includes the automatic transmission 18. It is considered that when the gear stage (gear ratio γ) of the automatic transmission 18 is a high gear stage (high gear ratio) that is a gear stage (gear ratio) on the higher vehicle speed side, the sensitivity to a shock tends to become lower. Therefore, the electronic control device 80 may provide the first engine start control when the gear stage (gear ratio γ) of the automatic transmission 18 is a high gear stage (high gear ratio) as compared to the second engine start control.

The vehicle 10 of this example includes the torque converter 16 having the lockup clutch 38. It is considered that the start shock is easily suppressed when the lockup clutch 38 is slip-engaged or released as compared to when the lockup clutch 38 is engaged. Therefore, if the lockup clutch 38 is engaged at the start of the engine 14, the electronic control device 80 starts the operation of the engine 14 (e.g., starts executing the ignition start) after starting a shift of the lockup clutch 38 to a slip state.

To easily obtain of the shock reduction effect from the slip state of the lockup clutch 38, it is conceivable that the start timing of the ignition start is delayed. Additionally, it is considered that the shock should be suppressed even if the start of the engine 14 is delayed in the second engine start control. Therefore, the electronic control device 80 delays the timing of starting the operation of the engine 14 (e.g., the start timing of the ignition start) in the second engine start control as compared to the first engine start control.

If the lockup clutch 38 is shifted from an engaged state to the slip state at the start of the engine 14, it is considered that a release shock easily occurs if the lockup clutch 38 is rapidly shifted to the slip state. Therefore, the electronic control device 80 elongates a period from the start of the shift of the lockup clutch 38 to the slip state until the lockup clutch 38 actually slips (i.e., a shift is slowly made from the engaged state to the slip state) in the second engine start control as compared to the first engine start control.

A user request may overlap with a system request. If a user request is made, it is considered that the improvement in responsiveness of the engine start should be prioritized over the suppression of the start shock. For example, if the user request is made during the start due to a system request and the second engine start control is continued without change, the responsiveness may deteriorate. Therefore, if the start due to a user request and the start due to a system request are overlappingly requested, the electronic control device 80 preferentially provides the first engine start control. Therefore, if a user request is made while the second engine start control is being provided as the start due to a system request, the electronic control device 80 terminates the provision of the second engine start control and provides the first engine start control.

More specifically, returning to FIG. 2, a running state determining means, i.e., a running state determining portion 86 determines whether an engine start request is made for requesting a start of the engine 14, for example. For example, the running state determining portion 86 determines that the engine start request is made in at least one of the cases where a transition of the vehicle state is made from the EV region to the EHV region, where the EV running is limited, where the charging of the electric storage device 54 is requested, and where the engine 14 etc. must be warmed up. Additionally, if it is determined that an engine start request is made, the running state determining portion 86 determines whether the start due to the engine start request is the start due to a user request based on whether the transition of the vehicle state from the EV region to the EHV region is made in association with a user operation such as an accelerator depression operation, for example. The running state determining portion 86 also determines whether the gear stage (gear ratio γ) of the automatic transmission 18 is on the predetermined low gear stage (low gear ratio) side. This predetermined low gear stage (low gear ratio) side is a gear stage (gear ratio γ) on the lower gear stage (lower gear ratio) side including a predefined gear stage (gear ratio γ) at which the start shock is not suppressed when the first engine start control is provided at the engine start, for example.

For example, if the running state determining portion 86 determines that the engine start request is made when the lockup clutch 38 is engaged without a slip, the lockup control portion 82 outputs to the hydraulic control circuit 50 the predetermined LU command pressure reducing the LU oil pressure for the slip engagement of the lockup clutch 38. In this case, if the running state determining portion 86 determines that this is the start due to a user request or that the gear stage (gear ratio γ) of the automatic transmission 18 is not on the predetermined low gear stage (low gear ratio) side, the lockup control portion 82 outputs the predetermined LU command pressure causing a larger reduction gradient of the LU oil pressure as compared to the other cases.

If the running state determining portion 86 determines that the engine start request is made, the hybrid control portion 84 starts the engine 14 by using the start method B with the ignition start. In this case, if the running state determining portion 86 determines that this engine start request is due to a user request or that the gear stage (gear ratio γ) of the automatic transmission 18 is not on the predetermined low gear stage (low gear ratio) side, the hybrid control portion 84 provides the first engine start control as the start control due to a user request. If the running state determining portion 86 determines that this engine start request is not due to a user request and that the gear stage (gear ratio γ) of the automatic transmission 18 is on the predetermined low gear stage (low gear ratio) side, the hybrid control portion 84 provides the second engine start control as the start control due to a system request.

When providing the first engine start control, the hybrid control portion 84 may immediately initiate the ignition start when it is determined that the engine start request is made, or may initiate the ignition start after a slip actually occurs in the lockup clutch 38. The hybrid control portion 84 increases the K0 torque by a predetermined torque during the ignition start and causes the electric motor MG to output the MG compensation torque corresponding to the K0 torque. After completion of the ignition start, the hybrid control portion 84 maintains the K0 torque at zero or minute torque and increases the engine rotation speed Ne by the self-sustaining operation through the engine rotation speed control. The hybrid control portion 84 increases the K0 torque for complete engagement of the connecting/disconnecting clutch K0 immediately before the engine rotation speed Ne reaches the electric motor rotation speed Nmg during the increase in the engine rotation speed Ne. For example, the K0 torque is increased such that an actual value of the K0 torque rises when the engine rotation speed Ne exceeds the electric motor rotation speed Nmg. After the engine rotation speed Ne exceeds the electric motor rotation speed Nmg, the hybrid control portion 84 changes the K0 torque=(Te+torque reducing the engine rotation speed Ne) depending on the engine torque Te such that the engine rotation speed Ne decreases toward the electric motor rotation speed Nmg in constant change, and causes the electric motor MG to output the MG compensation torque corresponding to the K0 torque. After the engine rotation speed Ne decreases and synchronizes with the electric motor rotation speed Nmg, the hybrid control portion 84 outputs the K0 command pressure (e.g., a maximum K0 command pressure corresponding to the maximum value of the K0 clutch pressure) so as to acquire the K0 torque for properly transmitting the engine torque Te toward the drive wheels 34 (e.g., so as to acquire the final K0 torque for completely engaging the connecting/disconnecting clutch K0). The minute torque is a torque for improving the responsiveness of the connecting/disconnecting clutch K0 and is a K0 torque at a level generated by a positive margin of the K0 oil pressure for packing a pack clearance of the connecting/disconnecting clutch K0, for example. Alternatively, from another viewpoint, if the K0 torque is maintained at the minute torque, the MG compensation torque is switched between positive and negative torques when the engine rotation speed Ne increases and exceeds the electric motor rotation speed Nmg and, therefore, a shock may occur if the timing of the switching is wrong. Thus, the connecting/disconnecting clutch K0 may be slipped with a K0 torque at a level that such a shock does not cause a problem.

On the other hand, when providing the second engine start control, the hybrid control portion 84 initiates the ignition start after a slip actually occurs in the lockup clutch 38. The control during the ignition start and the control of maintaining the K0 torque at zero or minute torque and increasing the engine rotation speed Ne by the self-sustaining operation after completion of the ignition start are provided in the same way as the first engine start control. After the engine rotation speed Ne increases and exceeds the electric motor rotation speed Nmg, the hybrid control portion 84 reduces the engine rotation speed Ne toward the electric motor rotation speed Nmg in the self-sustaining operation through the engine rotation speed control while maintaining the K0 torque at zero or minute torque. After the engine rotation speed Ne decreases and synchronizes with the electric motor rotation speed Nmg, the hybrid control portion 84 increases the K0 torque for the complete engagement of the connecting/disconnecting clutch K0.

Figure 5:
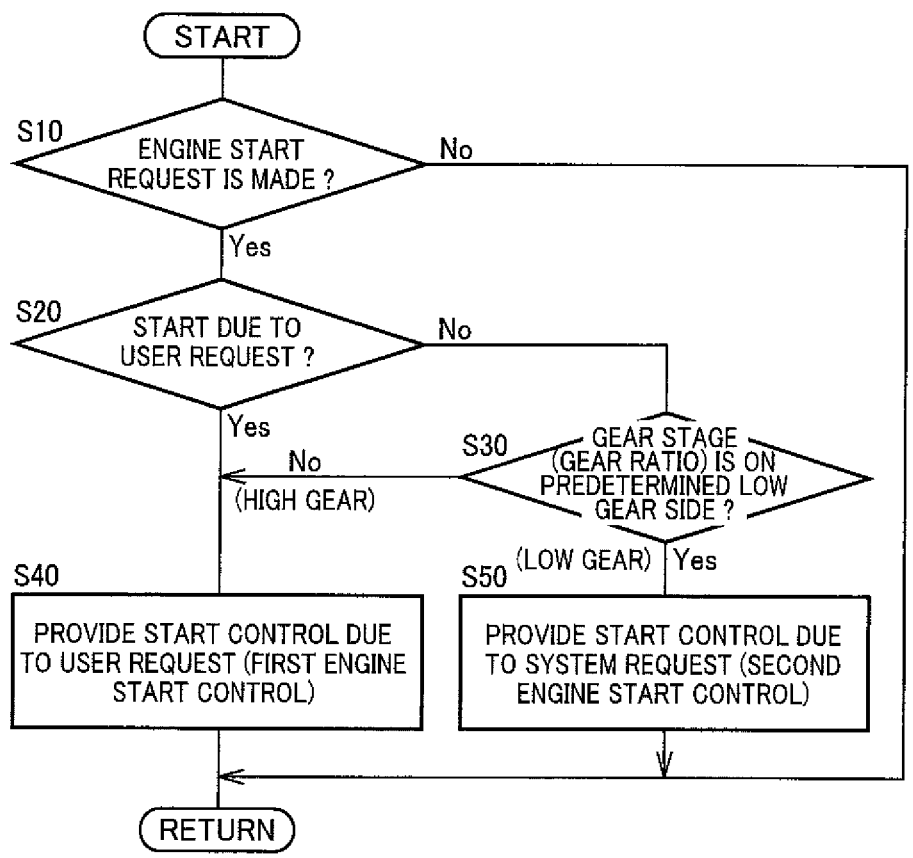
FIG. 5 is a flowchart for explaining a main portion of the control operation of the electronic control device, i.e., the control operation for satisfying both the suppression of the start shock and the improvement in responsiveness of the engine start at the engine start performed in such a manner that the rotation speed of the engine is increased in a release or slip state of a connecting/disconnecting clutch after the engine is operated.
Figure 6:
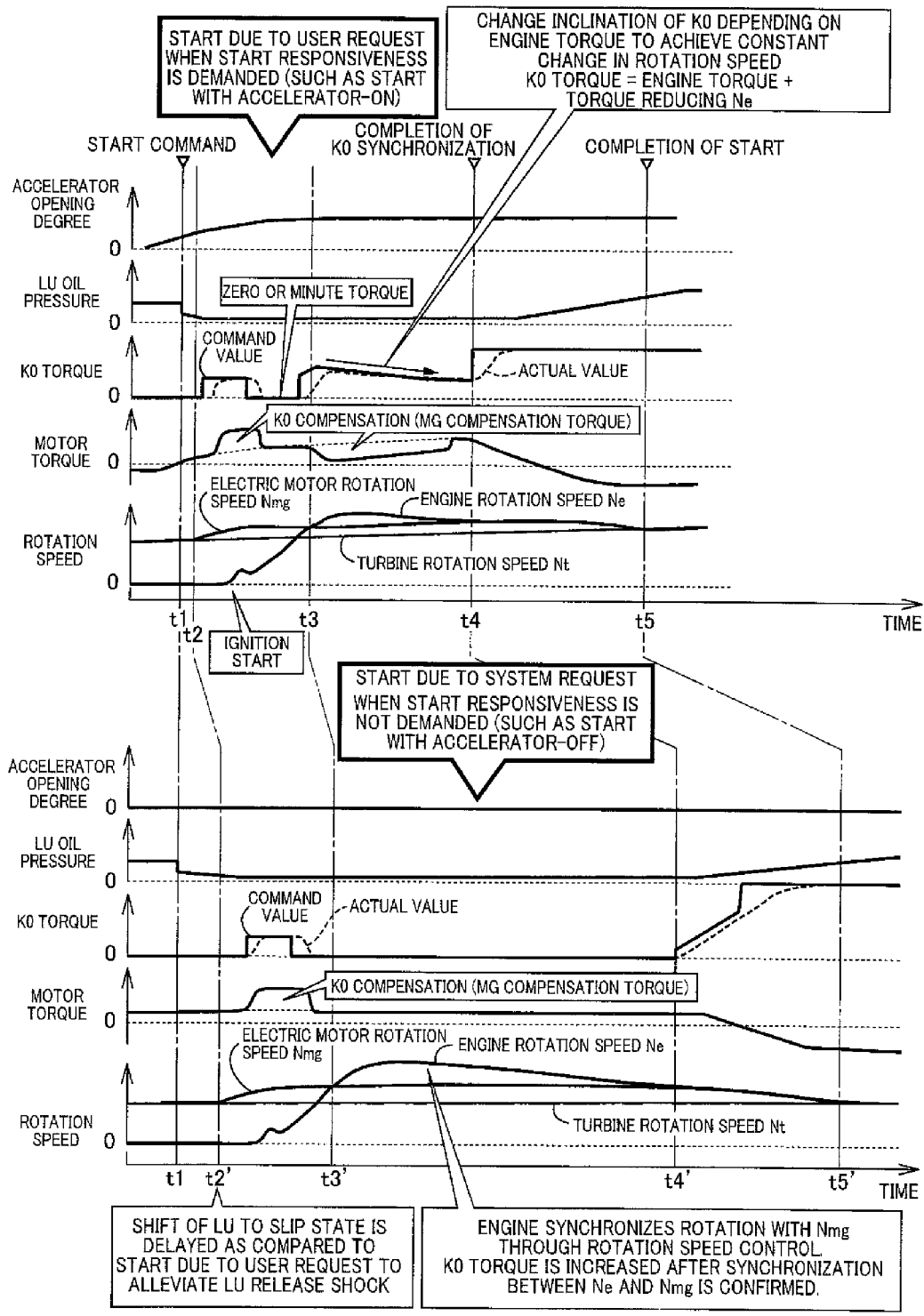
FIG. 6 is a time chart when the control operation depicted in the flowchart of FIG. 5 is executed.

FIG. 5 is a flowchart for explaining a main portion of the control operation of the electronic control device 80, i.e., the control operation for satisfying both the suppression of the start shock and the improvement in responsiveness of the engine start at the engine start performed in such a manner that the engine rotation speed Ne is increased in the release or slip state of the connecting/disconnecting clutch K0 after the engine 14 is operated (after the ignition start is completed), and is repeatedly executed with an extremely short cycle time, for example, on the order of a few msec to a few tens of msec. FIG. 6 is a time chart when the control operation depicted in the flowchart of FIG. 5 is executed.

In FIG. 5, first, at step (hereinafter, step will be omitted) S10 corresponding to the running state determining portion 86, it is determined whether an engine start request is made, for example. If the determination of S10 is negative, this routine is terminated and, if affirmative (at time t1 of FIG. 6), it is determined at S20 corresponding to the running state determining portion 86 whether this is the start due to a user request, for example. If the determination of S20 is negative, it is determined at S30 corresponding to the running state determining portion 86 whether the gear stage (gear ratio γ) of the automatic transmission 18 is on the predetermined low gear stage (low gear ratio) side, for example. If the determination of S20 is affirmative or if the determination of S30 is negative, the first engine start control is provided as the start control due to a user request at S40 corresponding to the hybrid control portion 84 (from time t1 to time t5 of FIG. 6 (on the upper side)). On the other hand, if the determination of S30 is affirmative, the second engine start control is provided as the start control due to a system request at S50 corresponding to the hybrid control portion 84 (from time t1 to time t5' of FIG. 6 (on the lower side)).

The time chart of FIG. 6 represents an example in the case of the start control due to a user request (on the upper side) and an example in the case of the start control due to a system request (on the lower side) on the same time scale, for example. When a command for the start control due to a user request is output (at time t1), the lockup clutch 38 is shifted to the slip state relatively early (at time t2) and the ignition start is performed. The K0 torque is increased before the time point (time t3) at which the engine rotation speed Ne reaches the electric motor rotation speed Nmg during an increase in the engine rotation speed Ne by the self-sustaining operation after completion of the ignition start. After the engine rotation speed Ne exceeds the electric motor rotation speed Nmg, the K0 torque is changed to reduce the engine rotation speed Ne toward the electric motor rotation speed Nmg (from time t3 to time t4). After completion of synchronization between the engine rotation speed Ne and the electric motor rotation speed Nmg (at time t4), the K0 command pressure for completely engaging the connecting/disconnecting clutch K0 is output, and the LU oil pressure is increased for engagement of the lockup clutch 38 (after time t4). Subsequently, the lockup clutch 38 is reengaged to relatively promptly complete a sequence of the engine start control due to a user request (at time t5). On the other hand, if a command for the start control due to a system request is output (at time t1), the lockup clutch 38 is relatively slowly shifted to the slip state (at time t2') and the release shock is alleviated. Subsequently, the ignition start is performed, and the engine rotation speed Ne is increased by the self-sustaining operation after completion of the ignition start (from time t2' to time t3'). After the engine rotation speed Ne exceeds the electric motor rotation speed Nmg (after time t3'), the engine rotation speed Ne is reduced toward the electric motor rotation speed Nmg in the self-sustaining operation (from time t3' to time t4'). After completion of synchronization between the engine rotation speed Ne and the electric motor rotation speed Nmg (at time t4), the K0 torque is increased for complete engagement of the connecting/disconnecting clutch K0, and the LU oil pressure is increased for engagement of the lockup clutch 38 (after time t4'). Subsequently, the lockup clutch 38 is reengaged to complete a sequence of the engine start control due to a system request (at time t5').

As described above, this example enables selective use of the first engine start control in which the engine 14 is relatively promptly started although the start shock easily occurs and the second engine start control in which the start shock is easily suppressed although the engine 14 is relatively slowly started, in accordance with a situation when the start of the engine 14 is requested. Therefore, when the engine is started in such a manner that the engine rotation speed Ne is increased in the release or slip state of the connecting/disconnecting clutch K0 after the engine 14 is operated, both the suppression of the start shock and the improvement in responsiveness of the engine start can be satisfied.

According to this example, since the first engine start control is provided in the start control due to a user request while the second engine start control is provided in the start control due to a system request, both the suppression of the start shock and the improvement in responsiveness of the engine start can properly be satisfied by switching the engine start control between a user request and a system request. In particular, a prompt start can be achieved at the start due to a user request, and the start can be achieved with the shock suppressed at the start due to a system request.

According to this example, since the first engine start control is provided when the gear ratio γ of the automatic transmission 18 is a relatively high gear ratio as compared to the second engine start control, i.e., the provision of the first engine start control is more facilitated when the gear ratio γ is a higher gear ratio, the engine can promptly be started at a high gear ratio and the shock can be reduced at a low gear ratio. Therefore, the fuel consumption is improved by suppressing unnecessary fuel injection at a high gear ratio, and the drivability can be improved at a low gear.

According to the example, since the first engine start control is preferentially provided when the start due to a user request and the start due to a system request are overlappingly requested, the responsiveness of the start due to a user request can be improved and the drivability is improved. For example, if a user request is made during the start due to a system request, a reduction in the responsiveness can be suppressed by making a switch to the first engine start control that is the engine start control at the start due to a user request.

According to this example, when the lockup clutch 38 is engaged at the start of the engine 14, the operation of the engine 14 is started after starting a shift of the lockup clutch 38 to the slip state and, since the second engine start control delays the timing of starting the operation of the engine 14 as compared to the first engine start control, the shock reduction effect from the slip state of the lockup clutch 38 is more easily acquired and the shock can further be reduced at the start through the second engine start control.

According to this example, since the second engine start control has a longer period from the start of the shift of the lockup clutch 38 to the slip state until the lockup clutch 38 actually slips as compared to the first engine start control, the shock at the start through the second engine start control can further be reduced by slowly shifting the lockup clutch 38 to the slip state so that the shock hardly occurs.

Although the example of the present invention has been described in detail with reference to the drawings, the present invention is applied in other forms.

For example, in such a case that the engine 14 includes an intake valve driving device capable of changing intake valve timing (opening timing and/or closing timing of an intake valve) as needed in the example, the intake valve timing may be advanced to synchronize the engine rotation speed Ne with the electric motor rotation speed Nmg at the time of the start control due to a system request. The throttle valve opening degree θth may be reduced to synchronize the engine rotation speed Ne with the electric motor rotation speed Nmg at the time of the start control due to a system request. The advancing of the intake valve timing may be combined with the reduction in the throttle valve opening degree θth. As a result, the start time can be shortened and the drivability and the fuel consumption are improved.

In the example, the ignition timing of the engine 14 may be set to a point after the top dead center until the connecting/disconnecting clutch K0 is synchronized (i.e., until the engine rotation speed Ne is synchronized with the electric motor rotation speed Nmg). As a result, the start time can be shortened and the drivability and the fuel consumption are improved.

Although the connecting/disconnecting clutch K0 is completely engaged after the engine rotation speed Ne is synchronized with the electric motor rotation speed Nmg in the example, this is not a limitation. For example, the connecting/disconnecting clutch K0 may completely be engaged while the engine rotation speed Ne is changing for synchronization with the electric motor rotation speed Nmg. Although this is somewhat disadvantageous for the suppression of the shock, the responsiveness of the engine start is improved.

Although the engine 14 is started by the ignition start while being assisted by the electric motor MG in the example, this is not a limitation. For example, the assist by the electric motor MG is not necessarily needed. The engine 14 may be started by a starter motor disposed separately from the electric motor MG instead of the ignition start. In short, the present invention may be applicable as long as the engine rotation speed Ne is increased in the release or slip state of the connecting/disconnecting clutch K0 after the engine 14 is operated at the start of the engine 14.

The flowchart of FIG. 5 in the example may be provided with at least one of steps S20 and S30.

Although the torque converter 16 is used as the fluid power transmission device in the example, another fluid power transmission device such as a fluid coupling without a torque amplification effect may be used instead of the torque converter 16. If the shock reduction effect from the fluid power transmission device is not acquired, the fluid power transmission device may not necessarily be disposed.

Although the automatic transmission 18 is disposed on the vehicle 10 in the example, the automatic transmission 18 may not necessarily be disposed except a form in which the engine start control is switched depending on the gear ratio γ of the automatic transmission 18.

The above description is merely an embodiment and the present invention may be implemented in variously modified and improved forms based on the knowledge of those skilled in the art.

NOMENCLATURE OF ELEMENTS

10: vehicle
14: engine
16: torque converter (fluid power transmission device)
18: automatic transmission (transmission)
34: drive wheels
38: lockup clutch
80: electronic control device (control device)
K0: engine connecting/disconnecting clutch (clutch)
MG: electric motor

The invention claimed is:

1. A control device for a vehicle having an engine, an electric motor, and a clutch disposed in a power transmission path between the engine and the electric motor, the control device comprising:
a microcomputer including:
a hybrid control portion configured to control the engine, the electric motor and the clutch; and
a running state determining portion configured to determine a running state of the vehicle and to determine whether a start of the engine is requested, based on the running state of the vehicle,
the hybrid control portion configured to, when the running state determining portion determines that the start of the engine is requested, start the engine by increasing a rotation speed of the engine in a release or slip state of the clutch after a self-sustaining operation of the engine is enabled,
the hybrid control portion providing either
a first engine start control in which the hybrid control portion starts a control for complete engagement of the clutch the rotation speed of the engine reaches a rotation speed of the electric motor during an increase of the rotation speed of the engine, or
a second engine start control in which the hybrid control portion starts the control for complete engagement of the clutch after the rotation speed of the engine exceeds the rotation speed of the electric motor during the increase of the rotation speed of the engine, such that the control for complete engagement of the clutch is started after the rotation speed of the engine is synchronized with the rotation speed of the electric motor during a reduction of the rotation speed of the engine which is made after the increase of the rotation speed of the engine, or such that the control for complete engagement of the clutch is started while the rotation speed of the engine is on the way to being synchronized during the reduction of the rotation speed of the engine which is made after the increase of the rotation speed of the engine, and the hybrid control portion selectively using the first engine start control or the second engine start control in accordance with the vehicle state that is determined by the running state determining portion when the start of the engine is requested.

2. The control device of claim 1, wherein the hybrid control portion provides the first engine start control when the start of the engine is requested due to an artificial operation, and the hybrid control portion provides the second engine start control when the start of the engine is requested not due to the artificial operation.

3. The control device of claim 1, wherein the vehicle further includes a transmission making up a portion of a power transmission path between the electric motor and drive wheels of the vehicle, and wherein the hybrid control portion provides the first engine start control when a gear ratio of the transmission is higher than a predetermined value, and provides the second engine start control when the gear ratio of the transmission is not higher than the predetermined value.

4. The control device of claim 2, wherein when the start of the engine is requested due to the artificial operation and also is requested not due to the artificial operation, the hybrid control portion provides the first engine start control.

5. The control device of claim 1, wherein the vehicle further includes a fluid power transmission device that has a lockup clutch disposed in a power transmission path between the electric motor and drive wheels of the vehicle, and wherein when the lockup clutch is engaged at starting of the engine, the hybrid control portion starts the operation of the engine after a shift of the lockup clutch to a slip state is started, and wherein the second engine start control delays timing of start of the operation of the engine as compared to the first engine start control.

6. The control device of claim 5, wherein the second engine start control has a longer period from a start of the shift of the lockup clutch to the slip state until the lockup clutch actually slips as compared to the first engine start control.

7. The control device of claim 5, further comprising a lockup control portion configured to control an engagement oil pressure of the lockup clutch so as to control on operation of the lockup clutch, wherein the lockup control portion reduces the engagement oil pressure for the shift of the lockup clutch to the slip state, such that the engagement oil pressure is reduced at a rate lower in the second engine start control, than in the first engine start control.

* * * * *